July 23, 1940.  T. O. KOSATKA  2,209,230
FILLER BLOCK GASKET
Filed Nov. 19, 1938

INVENTOR.
Thomas O. Kosatka,
Parkinson & Lane
ATTORNEYS.

Patented July 23, 1940

2,209,230

UNITED STATES PATENT OFFICE 2,209,230

FILLER BLOCK GASKET

Thomas O. Kosatka, Chicago, Ill., assignor to Victor Manufacturing & Gasket Company, Chicago, Ill., a corporation of Illinois Application November 19, 1938, Serial No. 241,464

2 Claims. (Cl. 288—33)

The present invention relates to a gasket for use in automobiles and other power propelled vehicles, and more especially to a filler block gasket adapted to be associated with the filler block, crank case and cylinder block in such manner as to combine with the usual crank case gasket and reinforce and efficiently seal the corners against any possible leakage of oil or other fluid in the crank case.

The present novel construction comprises a pre-blanked gasket consisting of a strip of asbestos millboard having its opposite ends split or separated so that they may be bent or distorted, and conform to and completely seal the juncture of the crank case cover, filler block and cylinder block. The gasket so formed may then be treated and/or coated so as to render it oil resistant and resilient so that when it is placed under compression and subjected to relatively low pressures and temperatures, it forms an efficient seal against the leakage of oil or other fluids from the crank case.

Previously gaskets for such purposes have been made of cork, which at best provides but a temporary seal in that it lacks strength, has insufficient resistance to oil and heat, and changes its dimensions due to expansion and contraction resulting from variations in humidity and temperature.

In carrying out the present novel invention, the gasket is blanked or stamped from a sheet of asbestos millboard. The ends are then split and the gasket is treated or saturated in a bath comprising a modified alkyd resin or resinous solution which thoroughly impregnates the gasket and has an elastic plasticizing effect upon the relatively brittle asbestos fibres, giving the fibres and blanked strip greater inherent strength and resistance to the passage there-around or therethrough of oil or other fluid.

After the gasket has been thus treated, it is coated with an oil and other fluid resistant composition which provides a resilient protective coating or envelope completely covering the gasket, including the interior as well as the exterior surfaces of the split or separated ends. This, in addition to augmenting the plasticity and resiliency of the strip, also assures its return to its original shape and condition after repeated distortion or bending, or after repeated expansion and contraction of the parts to be sealed.

Further objects, advantages and capabilities will become apparent from the disclosure or are inherent in the device.

Figure 1:
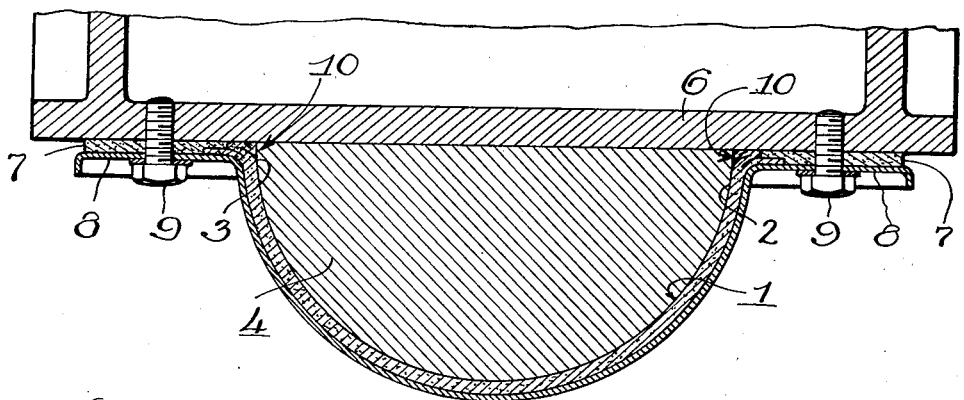
Fig. 1 is a view in side or end elevation of the novel gasket in assembled relation and with the parts to be sealed in vertical cross section.
Figure 2:
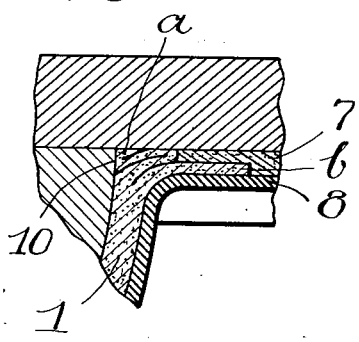
Fig. 2 is a fragmentary enlarged view of an end of the assembled gasket.
Figure 3:
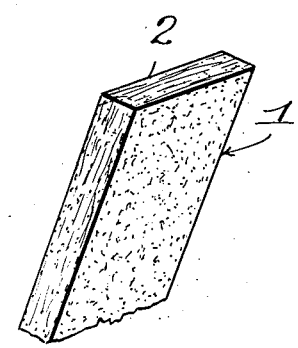
Fig. 3 is a fragmentary view of an end of the asbestos strip prior to splitting.
Figure 4:
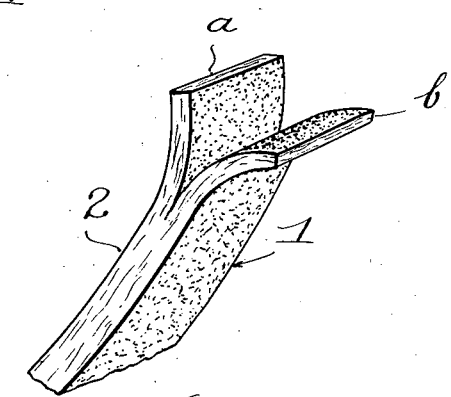
Fig. 4 is a view similar to Fig. 3 but with the end split or separated.
Figure 5:
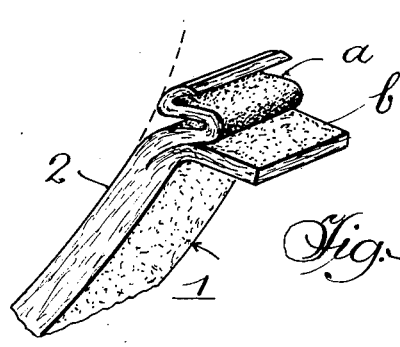
Fig. 5 is a view similar to Fig. 4 but showing the split ends bent or distorted to seal the corner or space formed at the juncture of the crank case cover, filler block and cylinder block.

Referring more particularly to the disclosure in the drawing, the novel gasket is shown as comprising a strip 1 of treated asbestos millboard having its opposite ends 2 and 3 split to provide separate projections or extensions a and b. The gasket is shown as mounted intermediate the filler block 4 and the crank case cover 5, and due to its resilient character, closely conforms to the contour of these parts with the ends suitably conforming to the contour of the cover 5 where it is secured to the cylinder block 6, and joining with the usual crank case gasket 7 secured between the flange 8 of the cover 5 and the block 6 by a bolt 9. Due to the ends 2 and 3 being split or separated and the treatment of these ends to insure their plasticity and elasticity, tightening of the bolts 9 causes a distortion and doubling up of these ends in such manner as to conform to the surfaces of the connecting parts, thereby forming a complete and tight seal at the corners 10.

In the preferred method of forming the novel gasket, the strips are sheared or blanked from a sheet of asbestos millboard. The ends 2 and 3 are then split or opened as shown in the drawing. This preformed gasket is then saturated or impregnated with a partially formed resin solution. For this purpose, excellent results have been obtained by using a long type alkyd resin comprising an initial mixture of phthalic anhydride and glycerol modified with a suitable oil to form a partially reacted resin. This partially formed resin is dissolved in sufficient solvent and the strip of asbestos is saturated with the resultant solution as by dipping or otherwise forcing the solution uniformly into the fibres of the gasket. The saturated gasket is then heated at a temperature sufficient to drive off or expel the solvent and further resinify the resinous saturant. By saturating the asbestos with the only slightly reacted resin which is later converted into a higher polymer, the initially brittle asbestos becomes flexible due to an elastic plasticizing effect and lubrication of the individual fibres of the mass.

The resin saturated gasket is next dipped in a solution of an oil resistant elastic composition which forms a resilient covering or envelope for the saturated strip. This coating solution completely surrounds the gasket with its split ends and seals these ends, edges and all vulnerable portions of the gasket. For such covering or coating, excellent results have been secured by using one of the so-called "synthetic rubbers," such as rubber hydrochloride, polyethyline sulfide, polymerized chloroprene or polymerized butadiene as coating materials, each compounded with a suitable filler such as carbon black, a suitable stabilizer such as lead oxide, and a softener such as chlorinated paraffin. If desired, a suitable curing agent may be added.

After compounding or mixing the above ingredients on a rubber mill, they are then dissolved in a suitable solvent so as to produce a solution of dipping consistency. The essential characteristics and properties of such a coating for the gasket are elasticity and resistance to attack by oils or other fluids.

After the gasket has been dipped in the oil resistant and elastic coating solution, it is dried to eliminate the solvent and heated or cured to polymerize the surface coating. If desired, the gasket may be treated to prevent it from sticking to the flanges or complementary surfaces of the joint. This may be accomplished by dusting the gasket with graphite, mica or suitable anti-friction material.

Although the ends of the gasket are shown as split, these ends may be formed in any other way so as to produce two or more projecting portions or extensions which may be readily bent or deformed to accommodate the contour of the juncture or opening to be sealed and to completely and effectively seal such opening.

I claim:

1. A filler block gasket for sealing the filler block and its connection with the crank case cover and cylinder block, comprising an elongated preformed, compressible strip composed of asbestos fiber having an end of said strip divided longitudinally thereof to form separate compressible projections, one of said projections being folded upon itself and compressed to form a thickened section whereby to conform to and seal the juncture of the filler block, crank case and cylinder block.

2. A filler block gasket for sealing the filler block and its connection with the crank case and cylinder block of an internal combustion engine, comprising an elongated preformed, resilient strip formed of asbestos fiber and having its ends divided to provide separate projections, one of said projections being folded and compressed to form a thickened portion so as to conform to and seal the corners formed by the juncture of the filler block, crank case and cylinder block, and an oil resistant and resilient coating for said preformed gasket.

THOMAS O. KOSATKA.